US012767316B2

(12) United States Patent
Lohmar

(10) Patent No.: US 12,767,316 B2
(45) Date of Patent: Oct. 20, 2026

(54) FUSELAGE HAVING AN AIR DISTRIBUTION SYSTEM

(71) Applicant: Airbus Operations GmbH, Hamburg (DE)

(72) Inventor: Jens Lohmar, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 376 days.

(21) Appl. No.: 18/532,329

(22) Filed: Dec. 7, 2023

(65) Prior Publication Data

US 2024/0217643 A1 Jul. 4, 2024

(30) Foreign Application Priority Data

Dec. 30, 2022 (EP) .................................... 22217305

(51) Int. Cl.
*B64C 1/40* (2006.01)
*B64D 13/00* (2006.01)

(52) U.S. Cl.
CPC .............. *B64C 1/406* (2013.01); *B64D 13/00* (2013.01)

(58) Field of Classification Search
CPC .......... B64C 1/406; B64D 13/00; B64D 13/08
USPC ............................ 138/118, 107; 454/69–165
See application file for complete search history.

(56) References Cited

U.S. PATENT DOCUMENTS

2011/0000569 A1* 1/2011 Lynch ..................... F16L 11/10 138/118
2020/0381911 A1 12/2020 Harleman et al.
2021/0188417 A1 6/2021 Maurel et al.
2021/0188445 A1 6/2021 Feuillerac et al.
2023/0057345 A1* 2/2023 Hegenbart .............. B64C 1/066

FOREIGN PATENT DOCUMENTS

DE 2733393 A1 2/1979
DE 102017112594 A1 12/2018

OTHER PUBLICATIONS

European Search Report for corresponding European Patent Application No. 22217305 dated Jun. 5, 2023; priority document.

* cited by examiner

*Primary Examiner* — Vivek K Shirsat
(74) *Attorney, Agent, or Firm* — Greer, Burns & Crain, Ltd.

(57) ABSTRACT

A fuselage having an air distribution system, including a fuselage primary structure two air distribution lines, arranged substantially parallel to one another and substantially side-by-side in a longitudinal direction of the fuselage. The air distribution lines are formed from a fluid-tight and flexible material, extend substantially in the longitudinal direction of the fuselage, and have a plurality of detachable fixing devices which are capable of fixing the air distribution lines to the fuselage or for fixing an air distribution line to the other air distribution line, in each case. The fixing devices are arranged on an air distribution line, in each case, along at least two fixing lines which extend in the longitudinal direction of the air distribution line and are at a distance from one another in the transverse direction of the air distribution line.

11 Claims, 3 Drawing Sheets

FUSELAGE HAVING AN AIR DISTRIBUTION SYSTEM

CROSS-REFERENCES TO RELATED APPLICATIONS

This application claims the benefit of the European patent application No. 22217305.6 filed on Dec. 30, 2022, the entire disclosures of which are incorporated herein by way of reference.

FIELD OF THE INVENTION

The invention relates to a fuselage having an air distribution system.

BACKGROUND OF THE INVENTION

Air distribution systems of this type are used as a component of aircraft air-conditioning systems which are used to set and maintain the desired ambient conditions in the aircraft cabin, for example the pressure, the temperature and the humidity of the cabin.

The cabin of a passenger aircraft is conventionally air conditioned both during flight operations and during ground operations of the aircraft by means of an on-board air-conditioning system. Bleed air taken off, for example, from the engine compressors or auxiliary engine compressors is supplied to the aircraft air-conditioning system, which bleed air is cooled to a desired low temperature in the air-conditioning units, known as the air-conditioning packs of the aircraft air-conditioning system. The air cooled in the air-conditioning packs of the aircraft air-conditioning system is conducted into a mixer, where it is mixed with recirculated air extracted from the aircraft cabin. The mixed air produced in the mixer from cold fresh air provided by the air-conditioning packs and recirculated air extracted from the aircraft cabin is lastly conducted into the aircraft cabin to air-condition the aircraft cabin.

In conventional aircraft air-conditioning systems, the mixed air produced is conducted into the aircraft cabin by means of an air distribution system. Since the central mixers are typically arranged in the lower deck region, in particular in the region of what is known as the "belly fairing" of the aircraft (approximately in the front region of the center wing box), the mixed air reaches the passenger regions in the upper deck of the aircraft firstly via longitudinally extending air distribution ducts and then via riser ducts.

Alternatively, DE 10 2017 112 594 A1 already discloses, for example, systems for mixing and distributing air in aircraft cabins, which systems comprise a fluid-tight air distribution line extending substantially in the longitudinal direction of a cabin. From single-piece air distribution lines of this type, additional small air distribution pipes then branch off into the aircraft cabin.

Aircraft typically undergo regular maintenance cycles. During maintenance, the structure of the fuselage often also has to be inspected, i.e., checked for imperfections of any type. For this purpose, elements installed in the fuselage interior might have to be dismantled in a time-consuming manner and temporarily removed to allow access to the relevant points for the inspection step. In the case of the above-mentioned single-piece air distribution lines, this can sometimes mean considerable outlay.

The problem addressed by the present invention is that of providing a fuselage having an air distribution system which allows simpler and less time-consuming inspection and maintenance.

SUMMARY OF THE INVENTION

The problem addressed by the invention is solved by a fuselage having an air distribution system, comprising a fuselage primary structure, two air distribution lines, which are arranged substantially parallel to one another and substantially side-by-side in a longitudinal direction of the fuselage, wherein the air distribution lines are each formed from a fluid-tight and flexible material, each extend substantially in the longitudinal direction of the fuselage and each have a plurality of detachable fixing devices which are capable of fixing the air distribution lines to the fuselage or of fixing an air distribution line to the other air distribution line in each case, wherein the fixing devices are arranged on an air distribution line in each case along at least two fixing lines which extend in the longitudinal direction of the air distribution line and are at a distance from one another in the transverse direction of the air distribution line. In the case of the fuselage according to the invention having an air distribution system, the presence of two air distribution lines which are spatially separated from one another advantageously makes it possible to detach the air distribution lines locally or over larger spatial regions either from the fuselage or from the other air distribution line in each case (by detaching each of the fixing devices) such that the air distribution lines can be moved away or removed, at least in part, from the original installation points thereof, locally or over larger spatial regions. In this manner, access at least in part to a region behind the air distribution lines (typically the inner face of the fuselage) can be provided for maintenance and/or inspection purposes. According to the invention, the air distribution lines can also be detached, for example, completely from one another and/or from the fuselage and subsequently folded away or swung out of the original position thereof (for example downwards) into a maintenance position. This means that the regions behind the air distribution lines are accessible.

Because the air distribution lines are formed from a fluid-tight and flexible material, the shape thereof is generally flexible. This means that, when compressed (when air is distributed in the aircraft cabin via the air distribution system during operation for air-conditioning and supply purposes), the air distribution lines generally take up the full volume thereof. The full cross section of the air distribution line is then typically filled up. When not compressed (e.g., during maintenance) the shape of the air distribution lines can change in principle, and the volume thereof can generally decrease. The cross section of the air distribution line can then be reduced. In addition to allowing access by detaching fixing devices, the fuselage according to the invention having an air distribution system can therefore also utilize the fact that the air distribution lines can reduce the volume thereof by letting out air. In this manner, additional space can be made available, and access can additionally be facilitated locally or over larger spatial regions. Preferably, the air distribution lines can therefore switch from a first state in which the flexible material is substantially taut, to a second state in which the flexible material is substantially slack. During the operation of the air distribution system, the air distribution lines accordingly take on the first state. In order to carry out maintenance on or inspect a spatial region near the air distribution lines, the air distribution lines accordingly take on the second state. To a certain extent, the second state can then be considered an interruption to the first (operating) state.

The access according to the invention can take place locally as described above, that is to say, it is possible, for example, for only a relatively small number of fixing devices to be detached when the flexible material is in the slack state, and thus the corresponding access is limited locally (e.g., for the size of what is known as a "manhole", i.e., an opening through which a person/worker passes). The access according to the invention can alternatively also take place over larger spatial regions, that is to say, for example, a relatively large number of fixing devices can be detached (e.g., over the length of a plurality of rows of seats) so that substantial regions of the structure located behind each of the air distribution lines can be uncovered and inspected, and maintenance can be carried out thereon.

The basic principle of the invention, i.e., allowing access by detaching fixing devices of the air distribution lines according to the invention, is independent of the selective change to the volume of the air distribution lines. Even without letting air out of the air distribution lines, according to the invention, these air distribution lines can be completely detached from one another and/or from the fuselage and subsequently folded away or swung out of the way, in order to allow access to the regions behind the air distribution lines.

Another advantage of the fuselage according to the invention having an air distribution system results from the presence of two air distribution lines. The width of the air distribution lines in the transverse direction of the fuselage therefore resulting in the region of single-aisle fuselages (that is to say, fuselages having a cross-sectional size for single-aisle seating) is typically reduced to a dimension which is generally compatible with the length of a person's arm. This improves the ergonomics when workers are carrying out maintenance or installation.

Another advantage of the fuselage according to the invention having an air distribution system lies in the fact that when the fixing devices are detached, and the air distribution lines are accordingly folded down or swung out of the way, the surfaces of the fixing devices and air distribution lines themselves can be inspected, and maintenance can be carried out thereon where necessary. Thus, any wear or leaks in the surface of the air distribution lines can be repaired without each line having to be dismantled and repaired elsewhere.

In principle, the air distribution lines can advantageously be adapted to the available installation space and the available volume because they are formed from a fluid-tight and flexible material. Deformations to the fuselage structure as a result of load can also be well absorbed and compensated for. In principle, the flexible material can have an additional insulation layer or can be provided with such.

In summary, it can be said that, by providing the at least two air distribution lines according to the invention, access to regions behind the air distribution lines can be allowed without having to completely remove these lines. In this manner, at least larger parts of a single air distribution line (as in the prior art) are advantageously prevented from having to be removed. When the air is additionally let out of the air distribution line, the flexibility of the air distribution line can also be used for this access.

In one preferred embodiment, fixing devices which are arranged along a first of the at least two fixing lines of an air distribution line fix the air distribution line to the fuselage primary structure. Depending on the installation situation, it can be expedient to fix the air distribution lines directly to the primary structure of the fuselage. In this way, loads can be transferred directly. It is possible for fixing devices which are arranged along a first fixing line of an air distribution line to fix this air distribution line directly to the primary structure, and for fixing devices which are arranged along a second fixing line of the same air distribution line to likewise fix this air distribution line to the primary structure. For example, the fuselage barrel consisting of the aircraft outer skin, known as "stringers" and "frames", is considered to be the primary structure. The fixing devices could attach, for example, to metal fittings or could be connected to such fittings which are rigidly connected to the primary structure.

It is likewise preferable for the fixing devices, which are arranged along two fixing lines arranged directly side-by-side, in particular which are arranged along two fixing lines arranged side-by-side of two different air distribution lines, to be able to be fixed to one another. In other words, the fixing devices are formed so as to be able to be interconnected in this way. In this manner, the two air distribution lines can likewise be prepared by merely detaching the fixing devices of the two fixing lines arranged (directly) side-by-side. After detaching these fixing devices, the two air distribution lines can advantageously be simply folded away from one another or swung away from one another to thus make the corresponding regions accessible.

One preferred development is characterized in that the fuselage further comprises a fuselage secondary structure which is fixed to the fuselage primary structure, fixing devices which are arranged along a first of the at least two fixing lines of an air distribution line fixing the air distribution line to the fuselage secondary structure. Depending on the installation situation, it can be expedient to fix the air distribution lines directly to a secondary structure of the fuselage. In this way, loads can be transferred indirectly. It is possible for fixing devices which are arranged along a first fixing line of an air distribution line to fix this air distribution line directly to the secondary structure, and for fixing devices which are arranged along a second fixing line of the same air distribution line to likewise fix this air distribution line to the secondary structure.

In one preferred development of the preceding embodiment, the fuselage secondary structure is frame structure having a modular construction for receiving cabin monuments. A frame structure having a modular construction of this type can be fixed, e.g., to the outer fuselage barrel. By way of example, luggage compartments (overhead luggage compartments) or the like can be considered as cabin monuments.

An embodiment in which the fixing devices are in the form of tabs made of a flexible material, in particular in which the fixing devices are in the form of textile hook-and-loop fastener tabs, is further preferred. Tabs of this type have proven advantageous in practice, since they allow detachable connection and fixing in a simple and rapid manner. Furthermore, these tabs allow frequent use without diminishing the fastening and fixing effect. As alternatives to the hook-and-loop fastener concept, tabs having a button and buttonhole concept and lashing straps are also conceivable.

Particularly preferably, the fluid-tight and flexible material is a woven material. Woven materials have proven expedient in practice and are characterized by a high resistance capacity as well as tightness and residual strength.

Another preferred embodiment is characterized in that the air distribution lines have a substantially oval or elongate cross section. Cross-sectional shapes of this type advantageously allow installation in various fuselage regions of modern aircraft and make the best possible use of the available space.

Preferably, the air distribution lines are further arranged in an overhead region of an upper deck of the fuselage. When the air distribution lines are arranged in the overhead region (that is to say, for example, directly in the region of the cabin ceiling at the highest point of the cabin), then access according to the invention can be achieved in a particularly simple manner in that, for example, cabin ceiling covers can be removed, and thus the air distribution lines can be reached directly, and the fixing devices can be detached directly. Extensive preparatory work for reaching the air distribution lines is thus no longer required. After detaching the fixing devices, it is also particularly simple to fold down the air distribution lines, at least in part. In practice, in this manner, for example, the fuselage primary structure behind the air distribution lines can be made accessible. It is thus possible to provide access to various antennae arranged in the region of the fuselage structure.

Lastly, an embodiment in which the air distribution lines are arranged in a triangular region of a lower deck of the fuselage and in which the air distribution lines are arranged vertically is preferred. In the case of such an arrangement, in principle, use is made of the same advantages as in all the above-described embodiments. In the lower deck of an aircraft, such as a cargo deck, that is to say, in a region of the fuselage underneath an intermediate floor, there are conventionally two regions known as triangular regions. In a cross-sectional view of the aircraft, these regions are each defined by the outer structure of the fuselage (for example, frames and stringers), the cross beams of the intermediate floor (for example, the supports of the intermediate floor) and what are known as Z struts, which conventionally extend vertically between a support of the intermediate floor and a frame, and are usually located on both sides of the aircraft. The Z struts are used, in particular, to support the intermediate floor in the vertical direction and to reinforce the aircraft structure underneath the intermediate floor. The triangular regions are often used to lay lines in the longitudinal direction of the aircraft. Normally, there are no interfering components arranged in the triangular regions, in particular in the transverse direction of the aircraft, and therefore lines can be laid from the nose to the tail of the aircraft, or at least from the airfoils to the nose and to the tail of the aircraft in the triangular regions. The triangular region is therefore suitable for housing air-conducting air distribution lines according to the invention.

The above-described aspects and additional aspects, features and advantages of the invention can likewise be found in the examples of the embodiment which are described in the following with reference to the accompanying drawings.

BRIEF DESCRIPTION OF THE DRAWINGS

In the drawings, like reference signs are used for like or at least similar elements, components or aspects. It should be noted that, in the following, embodiments are described in detail which are merely illustrative and non-limiting. In the claims, the word "comprising" does not exclude other elements, and the indefinite article "a" does not exclude a plurality. The mere fact that specific features are mentioned in various dependent claims does not limit the subject matter of the invention. Combinations of these features can advantageously also be used. The reference signs in the claims are not intended to limit the scope of the claims. The drawings are not to scale, but rather are merely schematic and illustrative. In the drawings:

DETAILED DESCRIPTION OF THE PREFERRED EMBODIMENTS

Figure 1A:
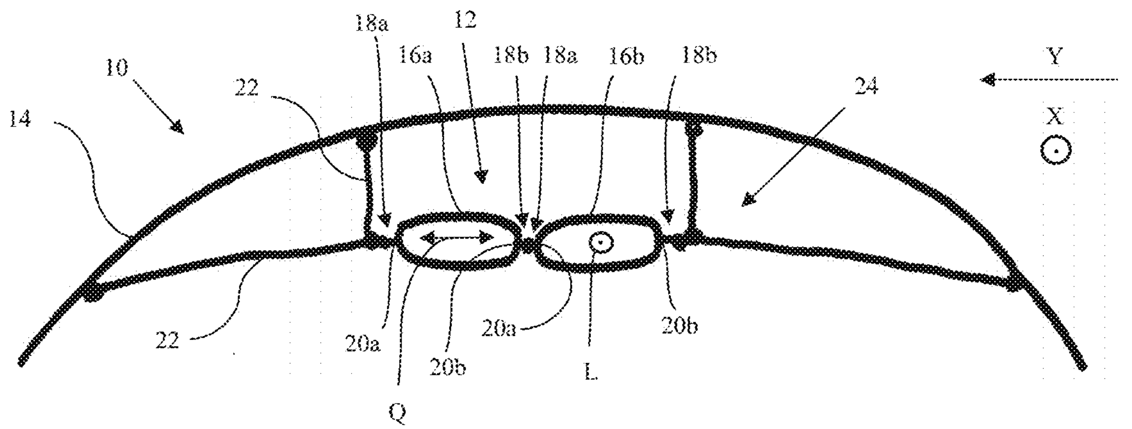
FIGS. 1*a* and 1*b* show a cross section through an upper region of a first embodiment of a fuselage according to the invention with an integrated secondary structure in a first state (1*a*) and a second state (1*b*)
Figure 1B:
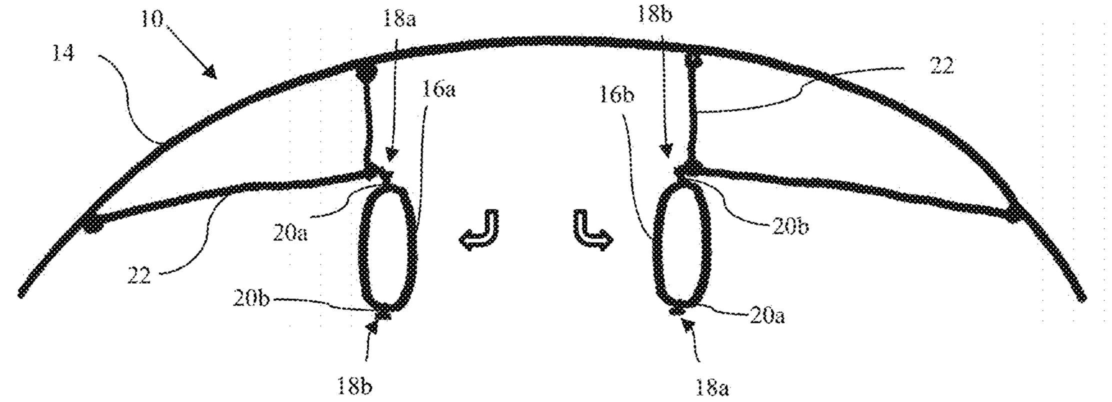

FIGS. 1*a* and 1*b* show a fuselage 10 having an air distribution system 12, comprising a fuselage primary structure 14 and two air distribution lines 16*a*, 16*b* which are arranged substantially parallel to one another and substantially side-by-side in a longitudinal direction X of the fuselage. The air distribution lines 16*a*, 16*b* are each formed from a fluid-tight and flexible material, extend substantially in the longitudinal direction X of the fuselage and have a plurality of detachable fixing devices 18*a*, 18*b* (cf. also FIG. 5). The fluid-tight and flexible material is typically a woven material, the air distribution lines 16*a*, 16*b* having a substantially oval or elongate cross section. The fixing devices 18*a*, 18*b* are capable of fixing the air distribution lines 16*a*, 16*b* to the fuselage 10. Alternatively, the fixing devices 18*a*, 18*b* are capable of fixing an air distribution line 16*a* to the other air distribution line 16*b* (or vice versa) in each case. The fixing devices 18*a*, 18*b* are arranged on an air distribution line 16*a*, 16*b*, in each case along at least two fixing lines 20*a*, 20*b* (in FIGS. 1*a* and 1*b* in the direction vertical to the plane of the drawing) which extend in the longitudinal direction L of the line (in FIGS. 1*a* and 1*b*, likewise vertically to the plane of the drawing) and are at a distance from one another in a transverse direction Q of the line.

The fuselage 10 further comprises a fuselage secondary structure 22 which is fixed to the primary structure 14. The secondary structure 22 is a frame structure having a modular construction for receiving cabin monuments, such as overhead luggage compartments of an aircraft cabin (these compartments are not shown in FIGS. 1*a* and 1*b*).

In the embodiment shown in FIGS. 1*a* and 1*b*, the air distribution lines 16*a*, 16*b* are arranged in an overhead region 24 of an upper deck of the fuselage 10, and the fixing devices 18*a*, 18*b* which are arranged along a first fixing line 20*a*, 20*b* of the two air distribution lines 16*a*, 16*b* in each case fix each air distribution line 16*a*, 16*b* to the fuselage secondary structure 22. Furthermore, in the embodiment shown in FIGS. 1*a* and 1*b*, the fixing devices 18*a*, 18*b* which are arranged along two fixing lines 20*a*, 20*b* arranged side-by-side of two different air distribution lines 16*a*, 16*b* (cf. FIG. 1*a*) are designed to be able to be fixed to and detached from one another. In other words: they are designed to be able to be interconnected.

In FIG. 1*a*, all the fixing devices 18*a*, 18*b* which correspond to one another are interconnected (that is to say, the air distribution lines 16*a*, 16*b* are fixed both to the fuselage secondary structure 22 and to the other air distribution line 16*a*, 16*b* in each case). This first state corresponds to a normal installation and operating state. In this first state, the air distribution system 12 and the air distribution lines 16*a*, 16*b* are used in accordance with requirements.

In FIG. 1*b*, the fixing devices 18*a*, 18*b*, which are arranged along the two fixing lines 20*a*, 20*b* arranged side-by-side of the two adjacent air distribution lines 16*a*, 16*b*, are detached (the fixing devices 18*a*, 18*b* are open) such that the two air distribution lines 16*a*, 16*b* could be folded away downwards (cf., thick, curved arrows in the middle of FIG. 1*b*). This second state corresponds to a maintenance or inspection state. In this second state, both the air distribution lines 16*a*, 16*b* and the structure previously concealed behind the lines (in principle both the fuselage primary structure and the fuselage secondary structure) can be inspected, and maintenance can be carried out thereon where necessary.

In the case of the fuselage 10 having an air distribution system 12, the presence of two air distribution lines 16*a*, 16*b* which are spatially separated from one another makes it possible to detach the air distribution lines 16*a*, 16*b* over larger spatial regions either from the fuselage 10 or from the other air distribution line 16*a*, 16*b* in each case (by opening or detaching the corresponding fixing devices 18*a*, 18*b*) so that the air distribution lines 16*a*, 16*b* can be moved away or removed, at least in part, from the original installation points thereof, over larger spatial regions. In this manner, access to the regions behind the air distribution lines 16*a*, 16*b* (typically the inner face of the fuselage 10) can be provided for maintenance and/or inspection purposes. As shown in FIG. 1*b*, the air distribution lines 16*a*, 16*b* can be detached from one another and thus swung into a maintenance position.

Figure 2:
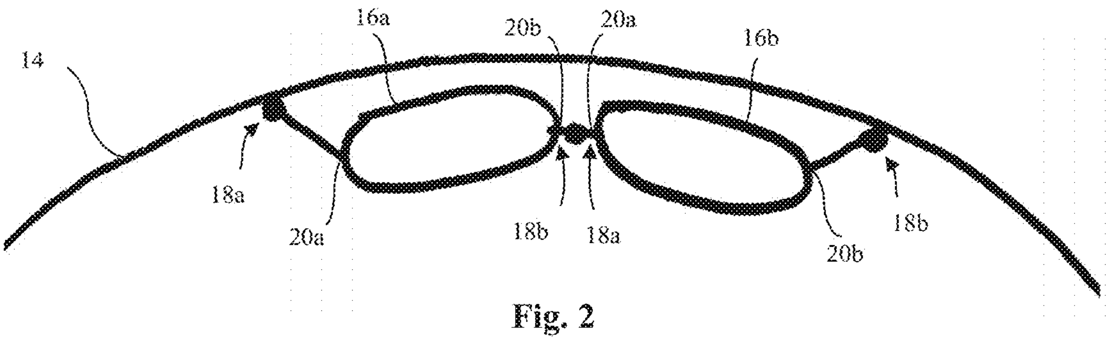
FIG. 2 shows a cross section through an upper region of a second embodiment of a fuselage according to the invention.

By contrast with FIGS. 1*a* and 1*b*, no secondary structure 22 is provided in FIG. 2, and therefore the air distribution lines 16*a*, 16*b* are instead fixed directly to the fuselage primary structure 14 by means of the fixing devices 18*a*, 18*b* which are arranged along the two outer fixing lines 20*a*, 20*b*. Thus, fixing devices 18*a*, 18*b* which are arranged along a first of the at least two fixing lines 20*a*, 20*b* of an air distribution line 16*a*, 16*b* fix the air distribution line 16*a*, 16*b* to the fuselage primary structure 14. Fixing devices 18*a*, 18*b* which are arranged along the two fixing lines 20*a*, 20*b* arranged directly side-by-side of the two air distribution lines 16*a*, 16*b* are interconnected in FIG. 2. It is understood that, by detaching these central fixing devices 18*a*, 18*b* similarly to in FIG. 1*b*, a state can be produced in which the air distribution lines 16*a*, 16*b* can likewise be folded away downwards (not shown).

Figure 3A:
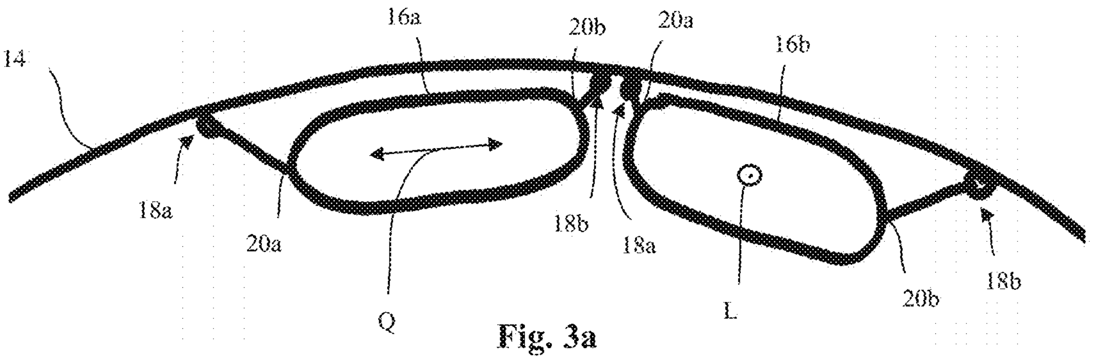
FIGS. 3*a* and 3*b* show a cross section through an upper region of a third embodiment of a fuselage according to the invention in a first state (3*a*) and a second state (3*b*)
Figure 3B:
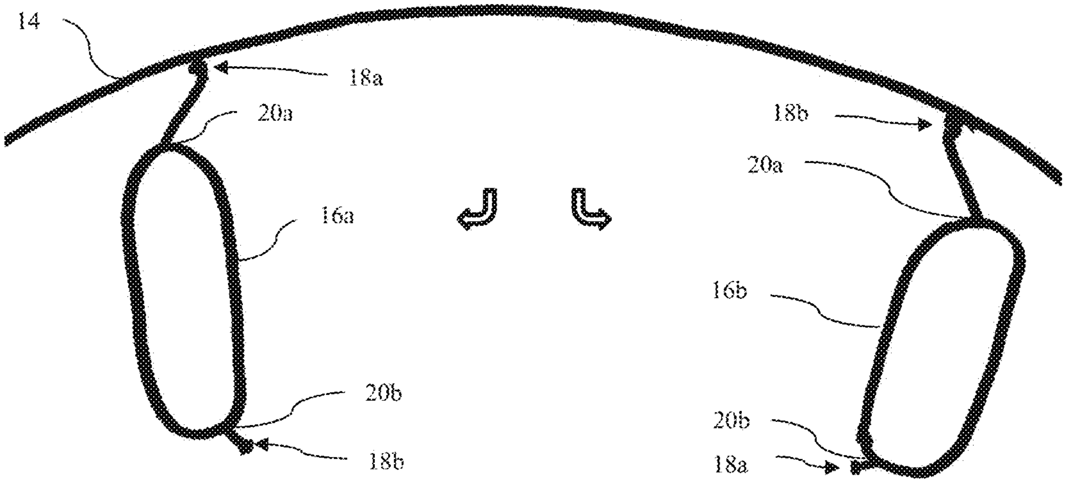

FIGS. 3*a* and 3*b* show, similarly to FIG. 1, a fuselage 10 having an air distribution system 12, comprising a fuselage primary structure 14 and two air distribution lines 16*a*, 16*b* which are arranged substantially parallel to one another and substantially side-by-side in a longitudinal direction X of the fuselage. The air distribution lines 16*a*, 16*b* are each formed from a fluid-tight and flexible material, extend substantially in the longitudinal direction X of the fuselage and have a plurality of detachable fixing devices 18*a*, 18*b*. The fixing devices 18*a*, 18*b* are capable of fixing the air distribution lines 16*a*, 16*b* to the fuselage 10.

Alternatively, the fixing devices 18*a*, 18*b* are capable of fixing an air distribution line 16*a*, 16*b* to the other air distribution line 16*a*, 16*b* in each case. The fixing devices 18*a*, 18*b* are each arranged on an air distribution line 16*a*, 16*b* along at least two fixing lines 20*a*, 20*b* which extend in the longitudinal direction L of the line and are at a distance from one another in a transverse direction Q of the line.

In the embodiment shown in FIGS. 3*a* and 3*b*, fixing devices 18*a*, 18*b* which are arranged along a first fixing line 20*a*, 20*b* of the two air distribution lines 16*a*, 16*b* in each case connect each air distribution line 16*a*, 16*b* to the fuselage primary structure 14. Furthermore, in the case of the embodiment shown in FIGS. 3*a* and 3*b*, the fixing devices 18*a*, 18*b* which are arranged along the other, second fixing line 20*a*, 20*b* in each case additionally connect each air distribution line 16*a*, 16*b* to the fuselage primary structure 14.

In FIG. 3*a*, fixing devices 18*a*, 18*b* are fixed to the fuselage primary structure 14. This first state corresponds to a normal installation and operating state. In this first state, the air distribution system 12 and the air distribution lines 16*a*, 16*b* are used in accordance with requirements.

In FIG. 3*b*, the fixing devices 18*a*, 18*b* which are normally fixed to the fuselage primary structure near the adjacent air distribution line 16*a*, 16*b* (cf., FIG. 3*a*) are instead detached (the corresponding fixing devices 18*a*, 18*b* are open) such that the two air distribution lines 16*a*, 16*b* could be folded away downwards. This second state corresponds to a maintenance or inspection state. In this second state, both the air distribution lines 16*a*, 16*b* and the structure previously concealed behind the lines can be inspected and maintenance can be carried out thereon where necessary.

Figure 4:
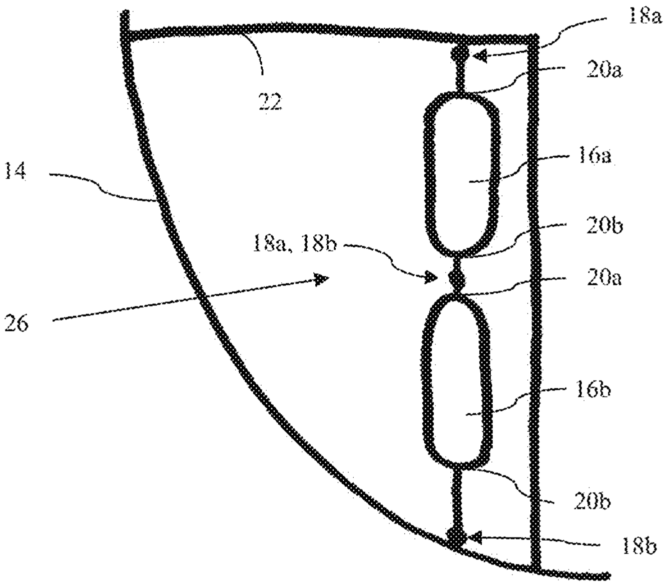
FIG. 4 shows a cross section through an upper region of a fourth embodiment of a fuselage according to the invention.

In FIG. 4, the air distribution lines 16*a*, 16*b* are alternatively arranged in a triangular region 26 of a lower deck of the fuselage 10. In this case, the air distribution lines 16*a*, 16*b* are arranged vertically one above the other. Fixing devices 18*a*, 18*b* which are arranged along the two fixing lines 20*a*, 20*b*, arranged directly one above the other, of the two air distribution lines 16*a*, 16*b* are shown in an interconnected state in FIG. 4. It is understood that, by detaching these central fixing devices 18*a*, 18*b* similarly to in FIG. 1*b*, a state can be produced in which the air distribution lines 16*a*, 16*b* can also be folded away from one another (not shown). By way of example, the lower air distribution line 16*a*, 16*b* could be folded away to the left in the direction of the outer skin such that the region behind what are known as the Z struts becomes accessible. The upper air distribution line could accordingly be swung upwards (and would have to be temporarily held there by suitable means) to likewise make the region behind what are known as the Z struts accessible.

Figure 5:
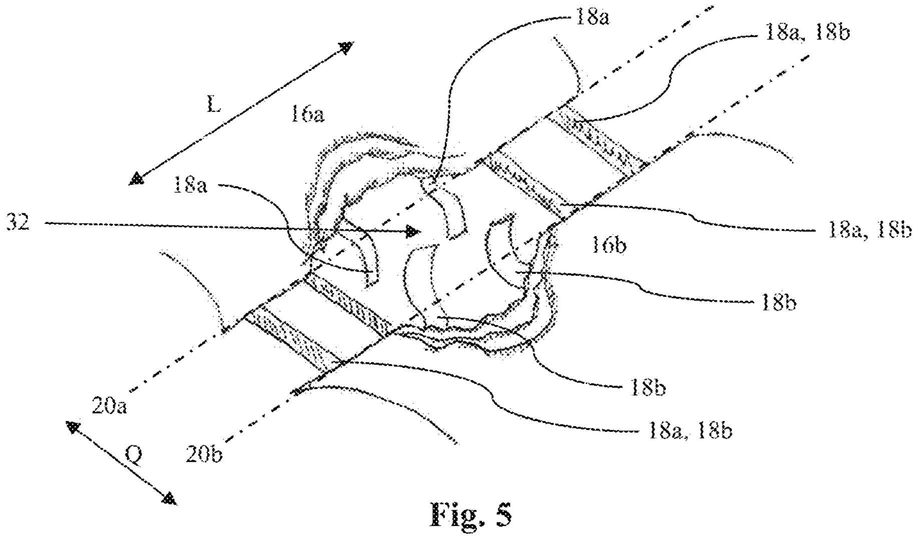
FIG. 5 is a perspective view of two air distribution lines arranged side-by-side, having a plurality of fixing devices for fixing to the other air distribution line in each case.

FIG. 5 is a perspective view of two air distribution lines 16*a*, 16*b* arranged side-by-side having a plurality of fixing devices 18*a*, 18*b* for fixing to the other air distribution line 16*a*, 16*b* in each case. The fixing devices 18*a*, 18*b* are capable of fixing an air distribution line 16*a*, 16*b* to the other air distribution line 16*a*, 16*b* in each case. In FIG. 5, only one fixing line 20*a*, 20*b* per air distribution line 16*a*, 16*b* is shown in each case, along which fixing line fixing devices 18*a*, 18*b* are arranged and formed on the respective air distribution lines 16*a*, 16*b*. However, it is understood that each air distribution line 16*a*, 16*b* further comprises at least one additional fixing line 20*a*, 20*b* (not shown in FIG. 5), along which fixing line additional fixing devices 18*a*, 18*b* are arranged and formed. These fixing lines 20*a*, 20*b* are arranged at a distance from one another in the transverse direction Q of the line. The fixing lines 20*a*, 20*b* extend in the longitudinal direction L of the line and parallel to one another. FIG. 5 shows by way of example in the longitudinal direction L of the line, six fixing devices 18*a*, 18*b* per air distribution line 16*a*, 16*b*. Of these fixing devices, the central two fixing devices 18*a*, 18*b*, in each case, are shown in a detached state (in which they are not interconnected or fixed to one another). The other, outer fixing devices 18*a*, 18*b* are shown, in each case, with opposite fixing devices 18*a*, 18*b* in a state in which they are interconnected or fixed to one another. In this manner, the access according to the invention, locally as described above, i.e., it is possible that, in the slack state of the flexible material, for example an opening 32 is formed through which workers can pass, and thus can inspect regions behind the air distribution lines 16*a*, 16*b*.

Figure 6:
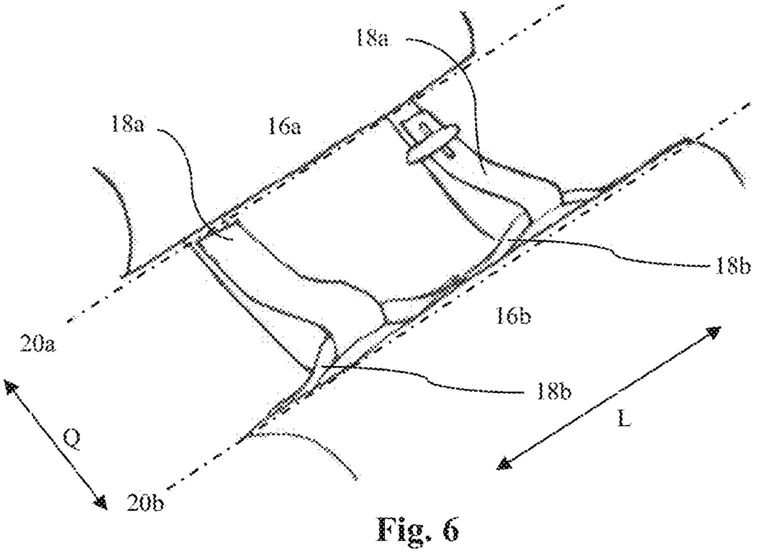
FIG. 6 is a perspective view of various embodiments of fixing devices.

In FIG. 6, two different embodiments of fixing devices 18*a*, 18*b* are shown. In the two embodiments, the fixing devices are in the form of tabs 18*a*, 18*b* made of a flexible material. The fixing device 18*a*, 18*b* can be formed as a tab and hook-and-loop fastener (on the lower left-hand side of FIG. 6) or alternatively as a tab having a button and buttonhole (see upper right-hand side of FIG. 6). Further alternatively, the fixing device 18*a*, 18*b* can also be achieved by lashing straps (not shown).

Figure 7:
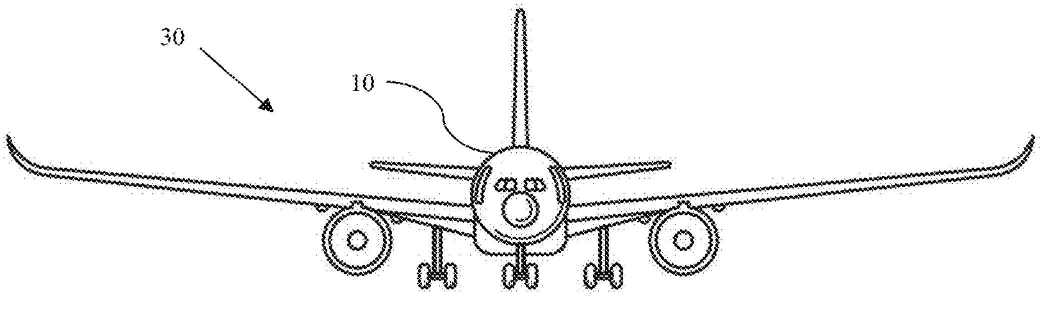
FIG. 7 shows an aircraft having a fuselage according to the invention.

FIG. 7 lastly shows an aircraft 30 comprising a fuselage 10 according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuselage having an air distribution system, comprising:

a fuselage primary structure, two air distribution lines which are arranged substantially parallel to one another and side-by-side, wherein the air distribution lines are each formed from a fluid-tight and flexible material, each extend substantially in a longitudinal direction of the fuselage, and each have a plurality of detachable fixing devices which are capable of fixing the air distribution lines to the fuselage or of fixing a first of the air distribution lines to a second of the air distribution lines, wherein the fixing devices are each arranged on one of the two air distribution lines along at least two fixing lines which extend in the longitudinal direction of the air distribution line and are at a distance from one another in a transverse direction of the air distribution line, wherein in a first state the fixing devices along a first fixing line and the fixing devices along a second fixing line attach the one of the two air distribution lines to the fuselage primary structure, and a portion of the fuselage is concealed behind the one of the two air distribution lines, wherein in a second state the fixing devices along the first fixing line are released from attachment to the fuselage primary structure, and the fixing devices along the second fixing line remain attached to the fuselage primary structure, and wherein, in the second state, the one of the two air distribution lines is folded away from the other of the two air distribution lines such that the portion of the fuselage concealed behind the one of the two distribution lines is no longer concealed by the one of the two distribution lines.

2. The fuselage according to claim 1, wherein fixing devices which are arranged along a first of the at least two fixing lines of one of the air distribution lines, fix the air distribution line to the fuselage primary structure.

3. A fuselage having an air distribution system, comprising:

a fuselage primary structure, two air distribution lines which are arranged substantially parallel to one another and side-by-side, wherein the air distribution lines are each formed from a fluid-tight and flexible material, each extend substantially in a longitudinal direction of the fuselage, and each have a plurality of detachable fixing devices which are capable of fixing the air distribution lines to the fuselage or of fixing a first of the air distribution lines to a second of the air distribution lines, wherein the fixing devices are each arranged on one of the two air distribution lines along at least two fixing lines which extend in the longitudinal direction of the air distribution line and are at a distance from one another in a transverse direction of the air distribution line, wherein the fixing devices, which are arranged along two fixing lines arranged directly side-by-side, and which are arranged along two fixing lines arranged side-by-side of two different air distribution lines, are configured to be fixed to one another.

4. The fuselage according to claim 1, wherein the fuselage further comprises a fuselage secondary structure which is fixed to the fuselage primary structure, the fixing devices which are arranged along a first of the at least two fixing lines of an air distribution line, fixing the air distribution line to the fuselage secondary structure.

5. The fuselage according to claim 4, wherein the fuselage secondary structure is a frame structure having a modular construction for receiving cabin monuments.

6. The fuselage according to claim 1, wherein the fixing devices are formed as tabs made of a flexible material.

7. The fuselage according to claim 6, wherein the fixing devices are formed of textile hook-and-loop fastener tabs.

8. The fuselage according to claim 1, wherein the fluid-tight and flexible material is a woven material.

9. The fuselage according to claim 1, wherein the air distribution lines have a substantially oval or elongate cross section.

10. The fuselage according to claim 1, wherein the air distribution lines are arranged in an overhead region of an upper deck of the fuselage.

11. The fuselage according to claim 1, wherein the air distribution lines are arranged in a triangular region of a lower deck of the fuselage, the air distribution lines being arranged vertically.

* * * * *